Dec. 25, 1951  G. A. LYON  2,579,506
WHEEL COVER
Filed Jan. 17, 1947
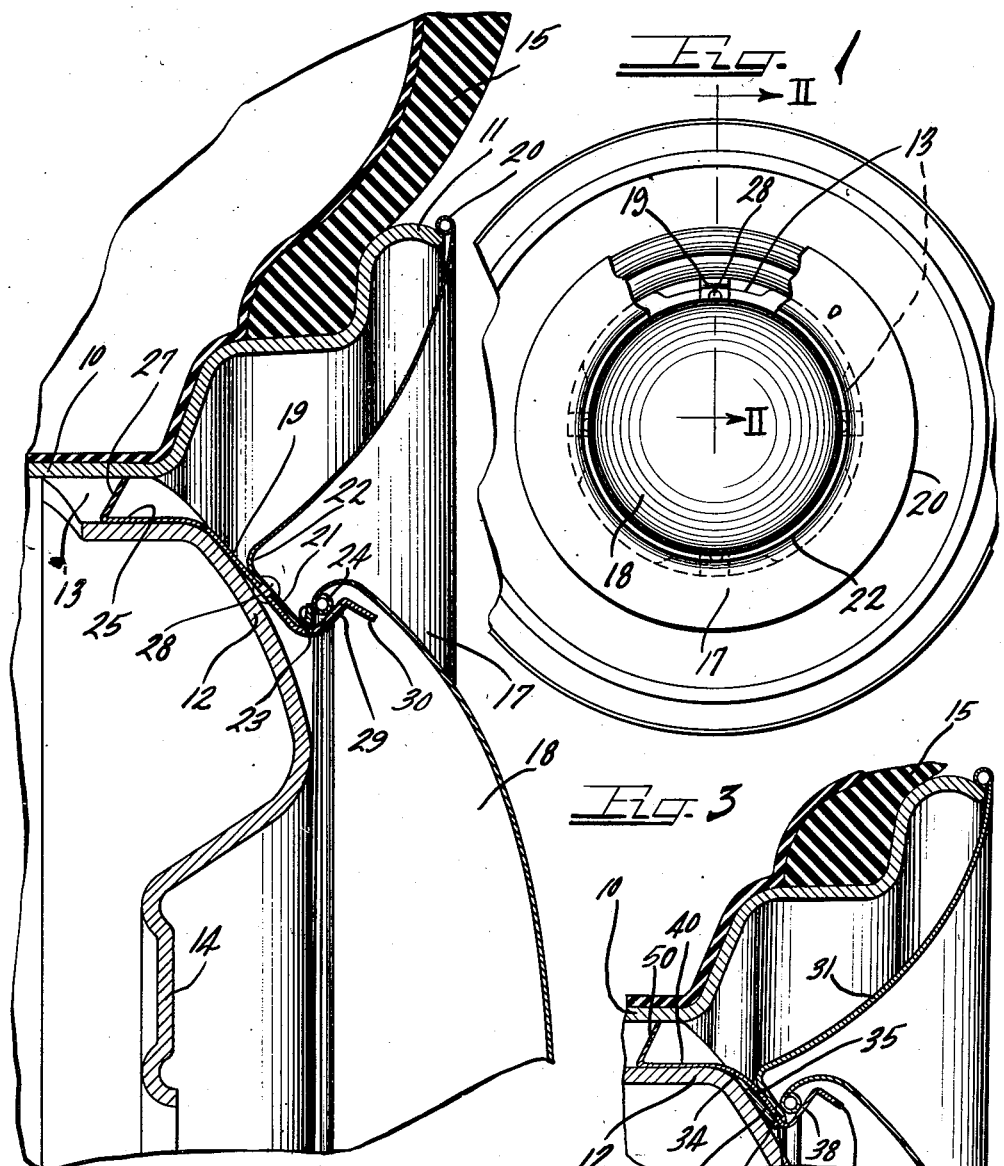
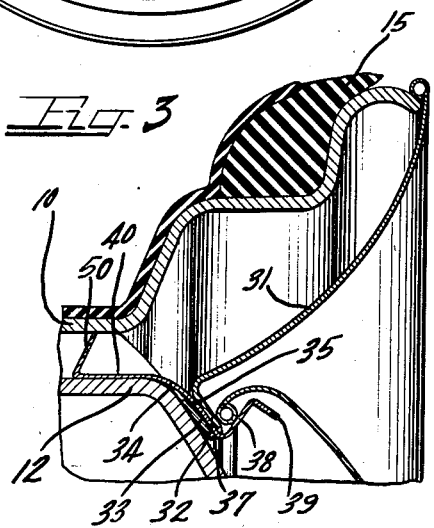
Inventor
GEORGE ALBERT LYON Patented Dec. 25, 1951

2,579,506

UNITED STATES PATENT OFFICE 2,579,506

WHEEL COVER

George Albert Lyon, Detroit, Mich.

Application January 17, 1947, Serial No. 722,659

12 Claims. (Cl. 301—37)

1

This invention is directed to an improved wheel structure for vehicles, and relates more particularly to a new and improved cover assembly therefor.

An important object of the present invention is to provide in a vehicle wheel structure such as may be used with an automobile or the like an improved cover assembly constructed as a self-contained unit of separable components including trim ring and hub cap portions.

Another object of the invention is to provide a novel composite wheel cover in which separable components are retained on the wheel by common retaining means.

A further object of the invention is to provide an improved vehicle wheel cover unit including an annular outer cover member retained more or less permanently upon the wheel and a circular inner cover member which is separably assembled in the cover unit.

A still further object of the invention is to provide in a novel cover assembly for a vehicle wheel improved retaining means which are operative not only to retain one cover component more or less permanently assembled on the wheel but also constructed and arranged to maintain another cover component on the wheel separably.

Yet another object of the invention is to provide an improved ornamental cover assembly for vehicle wheels which is adapted for ready application to the wheel without any alteration in the wheel structure itself.

According to the general features of the invention there is provided for use with a wheel including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will.

According to other general features of the invention, the retaining means comprise generally axially outwardly extending spring clip portions projecting beyond the inner margin of the outer cover member and engageable by the inner hub cap cover member in snap-on pry-off relationship.

According to further general features of the invention, the retaining means comprise a series of circularly spaced one-piece combination wheel-engaging fingers and cover-engaging spring clips, the annular outer cover member having an inner marginal flange secured in place with respect to an intermediate portion of each of the retaining means, the inner hub cap cover portion having a marginal formation engaging in snap-on pry-off relationship with the spring clip portions of the retaining means.

It is another feature of the invention to have the retaining means in the form of clip members each of which has an inner portion retainingly engageable with the wheel and an outer portion retainingly engageable by the inner hub cap cover member in separable relationship, the outer annular cover member being formed at its inner margin with a flange secured to an intermediate portion of the retaining clip members.

As another feature of the invention, the retaining means are in the form of elongated clips having inner wheel-engaging portions and outer spring clip portions engageable with the inner cover member, the outer cover member being formed with an inner marginal return bent flange formation interengaged with intermediate portions of the respective retaining clips.

According to still other general features of the invention there is provided for use with a vehicle wheel including a tire rim and a wheel body, a cover assembly including an annular trim ring member for substantially concealing the tire rim and having an arcuate cross sectional formation generally simulative of the curvature of the side wall of a tire mounted in the rim and adapted to be of light color as to be simulative of an inner white sidewall extension on the tire, a central hub cap-like cover member cooperative with the inner marginal portion of the trim ring cover member to afford a complete cover for the wheel, and retaining means carried by the inner marginal portion of the trim ring cover member and adapted for retaining engagement with the wheel and having spring clip means thereon for separable retention of the hub cap-like cover member.

Other objects, features and advantages of the present invention will be readily apparent from the following description of certain preferred embodiments of the invention in conjunction with the accompanying drawings, in which:

Fig. 1 is a fragmentary side elevational view of a vehicle wheel having assembled therewith a cover embodying the features of the invention in which certain portions of the cover are broken away to reveal details of the structure therebehind;

Figure 2 is an enlarged radial sectional view taken substantially along the line II—II of Figure 1; and Figure 3 is a radial sectional view taken substantially in the same plane as Figure 2 but showing a slightly modified form of the invention.

As shown on the drawings:

A wheel to which the cover of the present invention is adapted to be applied comprises a tire rim 10 which may be of the multi-flanged drop center type having an outer annular extremity flange 11 and secured at its base flange to a load-sustaining body part 12. Both the tire rim 10 and the body part 12 may be of conventional form and rolled or stamped from suitable gauge sheet metal. Between the base flange of the tire rim and the adjoining attached portion of the wheel body may be formed conventional ventilation openings 13 which may be in any suitable member, herein shown as 4. The wheel body 12 is formed with the customary central bolt-on flange, identified at 14, by which the wheel is secured to a part of the axle of the vehicle (not shown).

The flanged formation of the tire rim is suitable for supporting a conventional tire 15 with an inner tube assembled therein.

The angularly flanged exterior of the tire rim 10 and the conventional annularly bulging reinforced structure of the wheel body 12 presents an inherently unattractive appearance, and because of the numerous grooves and recesses inherent therein, dirt lodges thereon and further detracts from the appearance.

According to the present invention, the outer side of the wheel is concealed by an ornamental cover including an outer annular cover member 17 and an inner circular cover member 18 connected in assembly and attached to the wheel by means such as combination wheel-engaging and cover connecting retaining members 19.

The radially outer annular cover member 17 is in the form of a trim ring which is of a magnitude and extent preferably to cover in substantially complete concealing relation the outer side of the tire rim 10 and the juncture of the tire rim and the wheel body 12. Any preferred sheet material may be used in the manufacture of the trim ring member 17. In cross-sectional shape, the trim ring member 17 is preferably of smoothly convex external form substantially following the sidewall contour of the tire 15, and where it is of a light or white color simulates a white sidewall inner extension of the tire.

At its outer margin the trim ring cover member 17 is preferably formed with a reinforcing bead 20 which may be of a diameter to encircle the edge of the tire rim terminal flange 11. From the tire rim flange 11, the cover member 17 extends axially and radially inwardly to, or adjacent to, the body member 12 spaced radially inwardly from the juncture of the tire rim and the body member and preferably inwardly from the ventilation openings 13.

At its inner margin, the outer trim ring cover member 17 is formed with a reinforcing flange 21 which preferably extends generally radially inwardly and axially outwardly, divergently relative to the body of the cover member and joined thereto by a rounded convergent juncture 22. At its radially inner extremity, the flange 21 may be formed with a further narrow reinforcing flange 23 which as shown may be formed curved on a neat radius generally axially and radially outwardly.

The inner circular cover member 18 may be formed in the general shape of a relatively large hub cap and having its margin turned generally axially inwardly and slightly radially inwardly and curled upon itself to provide a reinforcing bead 24. The extreme outside diameter of the margin of the hub cap cover member 18 is preferably somewhat greater than the radially inner extremity of the marginal flange 21 of the outer cover member so that when the cover members are assembled in concentric relation, the outer margin of the inner hub cap cover member conceals the juncture thereof with the flange 21 of the trim ring cover member.

Not only are the cover members 17 and 18 connected to provide a unitary, self-contained, separable cover assembly, but the cover assembly is also secured to the wheel by the retaining members 19. For this purpose, the members 19 are formed from elongated sheet metal strips which may be of somewhat resilient characteristics and of ample hardness to be thoroughly form-sustaining and resistant to damaging distortions.

At their inner ends, the members 19 are each formed with a structure for engaging the wheel retainingly in a convenient efficient form including a generally axially inwardly extending leg portion 25. This leg portion is adapted to extend into one of the respective ventilation openings 13 and has the inner extremity portion thereof formed as radially outwardly and somewhat axially outwardly extending biting finger 27 arranged to engage the opposing face of the tire rim flange in wedging biting engagement with the leg portion 25 bearing against the wheel body 12 within the ventilation opening.

The main body portion of the retaining member 19 is preferably formed to extend from the leg 25 radially inwardly and axially outwardly generally conformable to the plane of the inner marginal reinforcing flange 21 of the trim ring cover member 17, and is engaged by the cover flange and preferably secured in assembly by means such as a rivet 28. As best seen in Figure 1, there are preferably a number of the retaining members 19 conforming to the number of ventilation openings 13 in the wheel and correspondingly spaced annularly on the flange 21.

As a result of the permanent attachment of the retaining members 19 to the inner marginal flange 21 of the trim ring cover member 17, mounting of the cover entails only generally concentrically disposing the cover with respect to the wheel and pushing axially inwardly thereon to drive the retaining legs 25 into the respective ventilation openings 13. Thereupon the biting fingers 27 engage in wedging, biting relation with the tire rim base flange. When the intermediate or body portions of the respective retaining members 19 engage the wheel body 12, the trim ring 17 will be fully assembled with the wheel and relatively permanently retained thereon. The relationship of the retaining members 19 to the radial extent and formation of the trim ring cover member 17 is preferably such that in the fully assembled relationship the outer margin of the trim ring cover member 17 is held under slight anti-rattle tension against the terminal flange 11 of the tire rim.

At their outer extremities, the retaining members 19 are each integrally formed with a generally radially and axially outwardly extending resilient spring clip latching shoulder portion 29 behind which the hub cap cover member retaining and reenforcing bead 24 is adapted to be engaged in snap-on pry-off relationship. A terminal cam flange 30 extending divergently from the retaining clip portion 29 in a generally axially outwardly and radially inward direction facilitates engagement of the hub cap cover member 18 with the clip portion 29. Thus, pressing the hub cap cover member 18 axially inwardly with the bead 24 against the cam flanges 30 causes the clip portions 29 to flex radially inwardly until the bead passes the hump at the convergence of the terminal cam flange and shoulder portions and snaps into assembled position.

The base of the latch portion 29 may join the body portion of the retaining members 19 on a rounded contour generally conforming to the cross sectional contour of the flange terminal 23 of the trim ring cover member. Thereby the inner edge portion of the bead 24 of the hub cap member may engage the flange terminal 23 in the fully assembled relationship of the cover members. Thus, the inner margin of the hub cap cover member 18 is maintained in spaced relation to the flange 21 of the trim ring cover member 17 and a pry-off tool may easily be inserted behind the hub cap cover member margin to pry the same free from the retaining clip latch portion 29.

It will thus be apparent that the cover members 17 and 18 may, through the connecting function of the retaining members 19 carried by the cover member 17, be assembled as a self-contained unit before or after assembly with the wheel. Assembly of the cover unit with the wheel is easily effected merely by pushing it axially into place, and this may be done on an existing wheel without any alteration in the structure thereof. After assembly of the cover assembly unit on the wheel, the inner or hub cap cover member 18 can easily be removed in much the same manner as an ordinary hub cap by prying it free whenever access is desired to the wheel body or the bolt-on flange 14 concealed by the hub cap cover member. To replace the hub cap cover member 18, it is simply pressed axially inwardly back into assembled relationship by snapping of the outer marginal bead 24 thereof into engagement with the latching clip portion 29 of the retaining members 19.

In the modified form of Figure 3, much the same results are attained, but a slightly different assembly of the retaining clips and the cover is effected. To this end a trim ring cover member 31, of substantially the same external characteristics as the previously described trim ring cover member 17, is provided. This cover member 31 has an inner marginal divergent, substantially radially inwardly and axially outwardly extending reinforcing flange 32 which is return bent upon itself axially inwardly and radially outwardly as at 33 to afford substantially double reinforcement. The return bent flange portion 33 also provides means for interengaging assembly with a suitable annularly spaced series of retaining members 34 of substantially the same kind as the retaining members 19.

An intermediate portion 35 of each of the retaining members 34 extends longitudinally between the opposing parallel flange portions 32 and 33 and projects at its axially outer end portion through an aperture 37 provided therefor at the juncture of the flange portions. The axially outer extremity portion of the retaining member 34 is formed with a resilient latching portion 38 and a cam portion 39. The axially inner portion of the retaining member 34 is formed with an axially inwardly extending leg 40 formed with a biting finger 50 substantially like the previously described retaining member 19 and functioning in like manner for wedging, biting retaining engagement with the base flange of the tire rim 10 and engaging the wheel body 12.

Relative generally radial movement of the retaining members 34 and the marginal flange portion 32, 33 of the cover member 31 is prevented by the angular formation of the retaining member whereby the flange portion 32 engages with the base of the latching clip portions 38 and the axially outer extremity of the retaining legs 40 where they join the respective main body portions 35 are adapted to engage with or at least closely oppose the adjacent edge of the inner marginal portion 33. This is of value in retaining the retaining members 34 against moving out of operative position prior to assembly of the cover with the wheel. After the cover has been assembled with the wheel, this assures that the trim ring cover member 31 will be held against radial displacement. The latter feature is further enhanced by the clamping of the under flange portion 33 against the wheel body 12 by the intermediate or body portion 35 of the retaining member.

A hub cap cover member 18 may be assembled with the cover member 31 and the retaining members 34 in the same manner as previously described in connection with hub cap cover member 18.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a wheel structure including a tire rim and a wheel body having wheel openings therebetween, a cover assembly for ornamentally concealing the outer side of the wheel comprising a radially outer annular member for substantially concealing the tire rim, an inner circular cover member in the nature of a hub cap, and retaining means engageable with the wheel structure in said wheel openings and retaining the outer annular cover member relatively fixedly assembled on the wheel but retaining the inner hub cap cover member separably so that the inner hub cap cover member can be readily pried free from the assembly and replaced at will, said retaining means comprising elongated strips having wheel engaging portions behind the outer cover member and generally axially outwardly extending spring clip portions projecting beyond the inner margin of the outer cover member and engageable by the inner hub cap cover member in snap-on pry-off relationship.

2. In a wheel structure including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will, said retaining means comprising a series of circularly spaced one-piece combination wheel-engaging fingers and cover-engaging spring clips, the annular outer cover member having an inner marginal flange secured in place with respect to an intermediate portion of each of the retaining means and the inner hub cap cover member having a marginal formation engaging in snap-on pry-off relationship with the spring clip portions of the retaining means, said flange having a generally radially outwardly directed terminal section spaced axially outwardly from the margin of the annular outer cover member and engaging behind the marginal formation of the hub cap cover member to retain the same in spaced relation to said marginal flange.

3. In a wheel structure including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will, said retaining means being in the form of clip members each of which has an inner portion retainingly engageable with the wheel and an outer portion retainingly engageable by the inner hub cap cover member in separable relationship, the outer annular cover member being formed at its inner margin with a generally radially inwardly and axially outwardly extending flange having a generally axially inwardly directed face secured against relative movement to an intermediate portion of the retaining clip members.

4. In a wheel structure including a tire rim and a wheel body, a cover assembly for ornamentally concealing the outer side of the wheel comprising a radially outer annular member for substantially concealing the tire rim, an inner circular cover member in the nature of a hub cap, and retaining means engageable with the wheel structure and retaining the outer annular cover member relatively fixedly assembled on the wheel but retaining the inner hub cap cover member separably so that the inner hub cap cover member can be readily pried free from the assembly and replaced at will, the retaining means being in the form of elongated clips having inner wheel-engaging portions and outer spring clip portions engageable with the inner cover member, the outer cover member being formed with an inner marginal return bent flange formation interengaged with intermediate portions of the respective retaining clips and clamped against the wheel body by said intermediate portions of the clips.

5. For use with a vehicle wheel including a tire rim and a wheel body, a cover assembly including an annular trim ring member for substantially concealing the tire rim and having an arcuate cross-sectional formation generally simulative of the curvature of the side wall of a tire mounted in the rim and adapted to be of light color so as to be simulative of an inner white sidewall extension on the tire, a central hub cap-like cover member cooperative with the inner marginal portion of the trim ring cover member to afford a complete cover for the wheel, and retaining strips carried by the inner marginal portion of the trim ring cover member and having generally radially outwardly extending biting finger terminals adapted for cover retaining engagement with the wheel and having spring clip portions thereon for separable retention of the hub cap-like cover member.

6. In a cover assembly for a vehicle wheel including a tire rim and a body part, a trim ring member for concealing the tire rim, a hub cap member of a diameter to cooperate with the margin of the trim ring member for concealing the central part of the wheel body, and clips carried by the inner margin of the trim ring member and having generally axially outwardly extending spring latch portions engageable in snap-on pry-off relation by the marginal portion of the hub cap member, said clips having respective generally axially inwardly extending portions offset radially outwardly relative to said latch portions and engageable with the wheel for retaining the cover in place thereon and also having intermediate generally radially extending portions located behind said inner margin to lie between said inner margin and the wheel body part.

7. In a cover assembly for a vehicle wheel including a tire rim and a body part, a trim ring member for concealing the tire rim, a hub cap member of a diameter to cooperate with the margin of the trim ring portion for concealing the central part of the wheel body, and clips carried by the inner margin of the trim ring member and having generally axially outwardly extending spring latch portions engageable in snap-on pry-off relation by the marginal portion of the hub cap member, said clips having generally axially inwardly extending portions engageable with the wheel for retaining the cover in place thereon, the margin of the hub cap member being formed with a generally axially inwardly extending reinforcing bead formation and the inner margin of the trim ring member including a generally axially outwardly extending inner extremity formation engageable with the hub cap bead for holding the latter in spaced relation to the trim ring cover member to facilitate the insertion of a pry-off tool behind the bead.

8. A cover assembly including a trim ring member, a hub cap member, and a series of spring clip members carried by the inner margin of the trim ring member and extending in generally radial direction with the radially inner extremities extending generally axially and radially outwardly providing resilient latches engageable in snap-on pry-off relation by the margin of the hub cap member, the radially outer portions of the clip members extending generally axially rearwardly and formed with biting fingers engageable retainingly in respective ventilation openings in the wheel.

9. In combination in a cover for disposition at the outer side of a vehicle wheel, a trim ring member, a hub cap member, and means for retaining the trim ring and hub cap members in snap-on pry-off assembly, the inner margin of the trim ring member including a terminal portion extending generally axially outwardly and the edge portion of the hub cap member seating on said terminal portion and maintained thereby in axially outwardly spaced relation to the adjacent inner margin of the trim ring member whereby to facilitate the insertion of a pry-off tool behind the margin of the trim ring member.

10. In a cover assembly for disposition at the outer side of a vehicle wheel, a trim ring member having an inner marginal generally divergent flange extending radially inwardly and axially outwardly, a series of spring clips having intermediate portions conforming to and mounted on the inner side of said flange with the end portions of the clips projecting respectively generally axially rearwardly for engagement with the wheel and axially outwardly, said axially outwardly projecting end portions providing resilient retaining formations, and a hub cap type cover member engageable in snap-on pry-off relation with said retaining formations of the clips.

11. In a cover assembly for disposition at the outer side of a vehicle wheel, a trim ring member having an inner marginal generally divergent flange extending radially inwardly and axially outwardly, a series of spring clips having intermediate portions conforming to and mounted on the inner side of said flange with the end portions of the clips projecting respectively generally axially rearwardly for engagement with the wheel and axially outwardly, said axially outwardly projecting end portions providing resilient retaining formations, and a hub cap type cover member engageable in snap-on pry-off relation with said retaining formations of the clips, the inner marginal flange portion of the trim ring member having a terminal reinforcing flange extending generally axially outwardly and serving as a seat for the edge of the hub cap member and retaining the hub cap member in spaced relation to the remainder of the marginal flange of the trim ring member.

12. In a cover assembly for disposition at the outer side of a vehicle wheel, a trim ring cover member having an inner marginal flange bent under upon itself and with the juncture projecting generally radially inwardly, and a series of spring clip elements carried by said flange and having intermediate portions interposed between the two portions of the flange with the flange portion juncture having openings through which the clips project, the clips having the inner end portions formed to effect retaining engagement with the wheel to which the cover may be applied and the outer end portions formed for retaining engagement with a second cover member.

GEORGE ALBERT LYON.

REFERENCES CITED

The following references are of record in the file of this patent:

UNITED STATES PATENTS

| Number | Name | Date |
| --- | --- | --- |
| 2,166,216 | Lyon | July 18, 1939 |
| 2,183,220 | Horn | Dec. 12, 1939 |
| 2,368,230 | Lyon | Jan. 30, 1945 |
| 2,368,240 | Lyon | Jan. 30, 1945 |
| 2,368,241 | Lyon | Jan. 30, 1945 |